Figure 1:
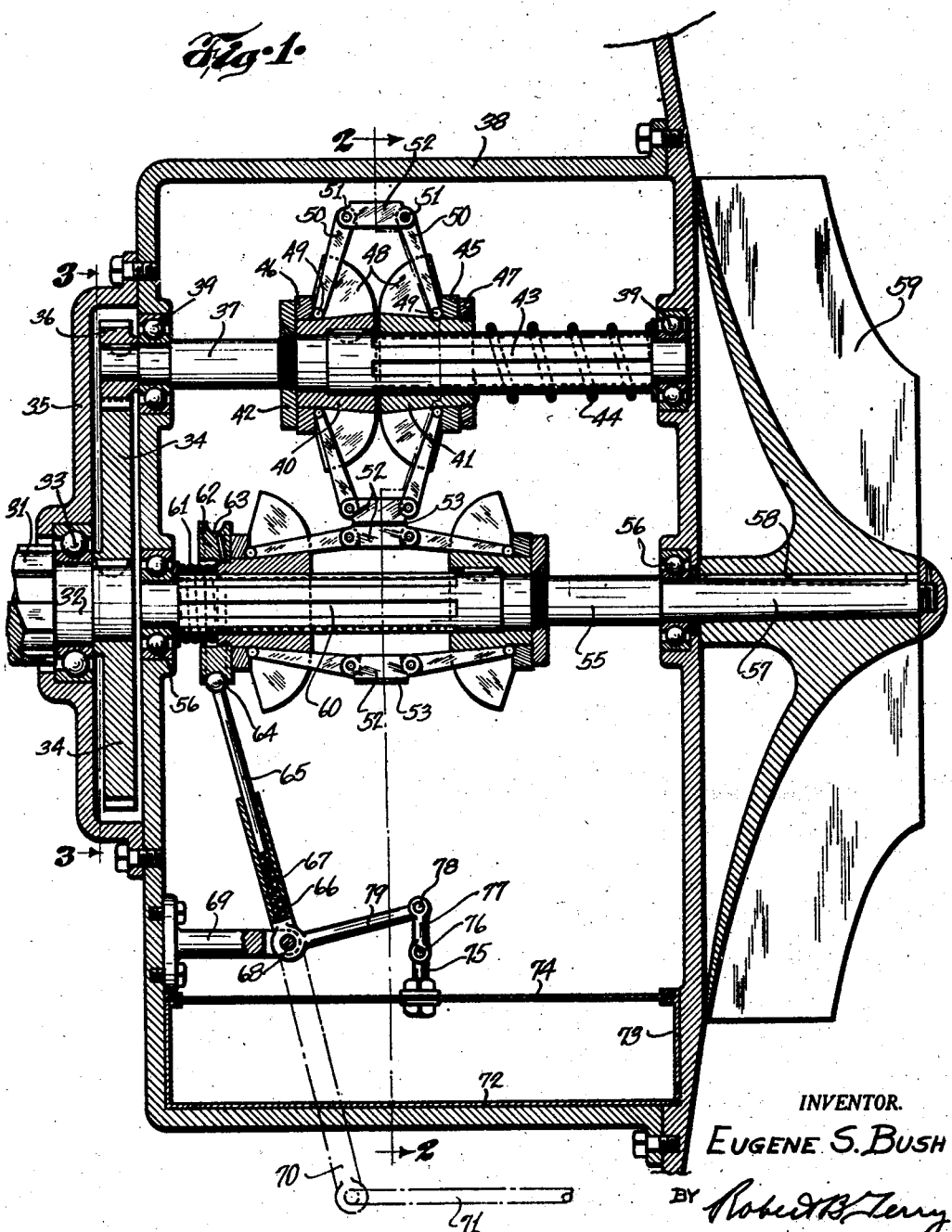

Jan. 25, 1938. E. S. BUSH 2,106,237
ENGINE BLOWER DRIVE AND CONTROL
Filed Feb. 4, 1935 5 Sheets-Sheet 1

INVENTOR.
EUGENE S. BUSH
BY
ATTORNEY

Jan. 25, 1938.　　　　E. S. BUSH　　　　2,106,237
ENGINE BLOWER DRIVE AND CONTROL
Filed Feb. 4, 1935　　　5 Sheets-Sheet 2
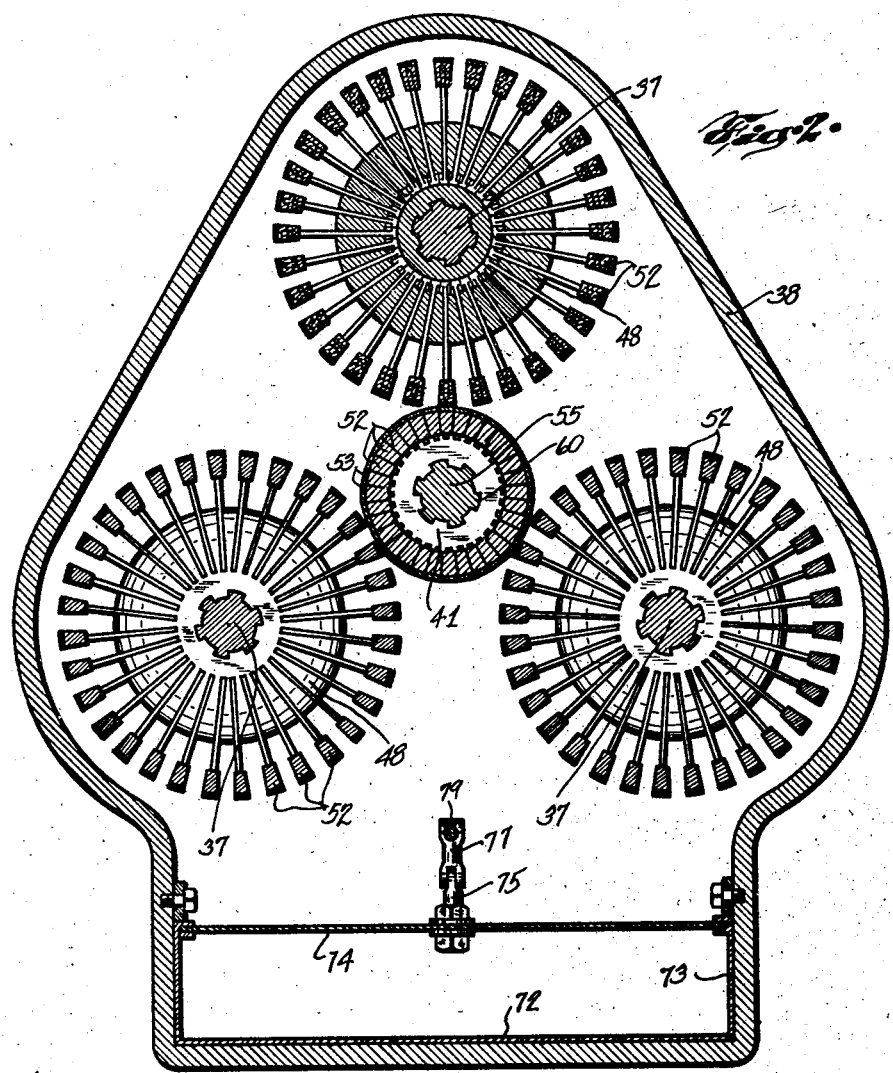
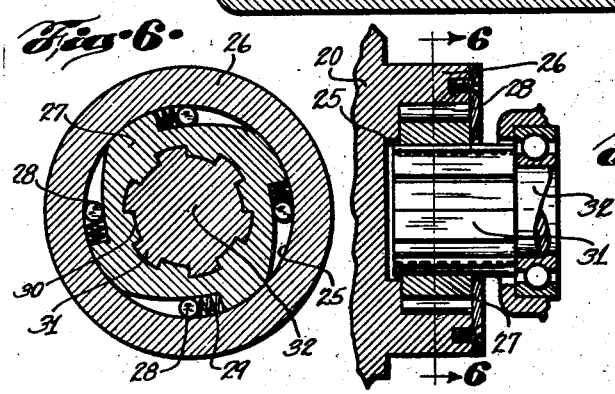
INVENTOR.
EUGENE S. BUSH
BY
ATTORNEY.

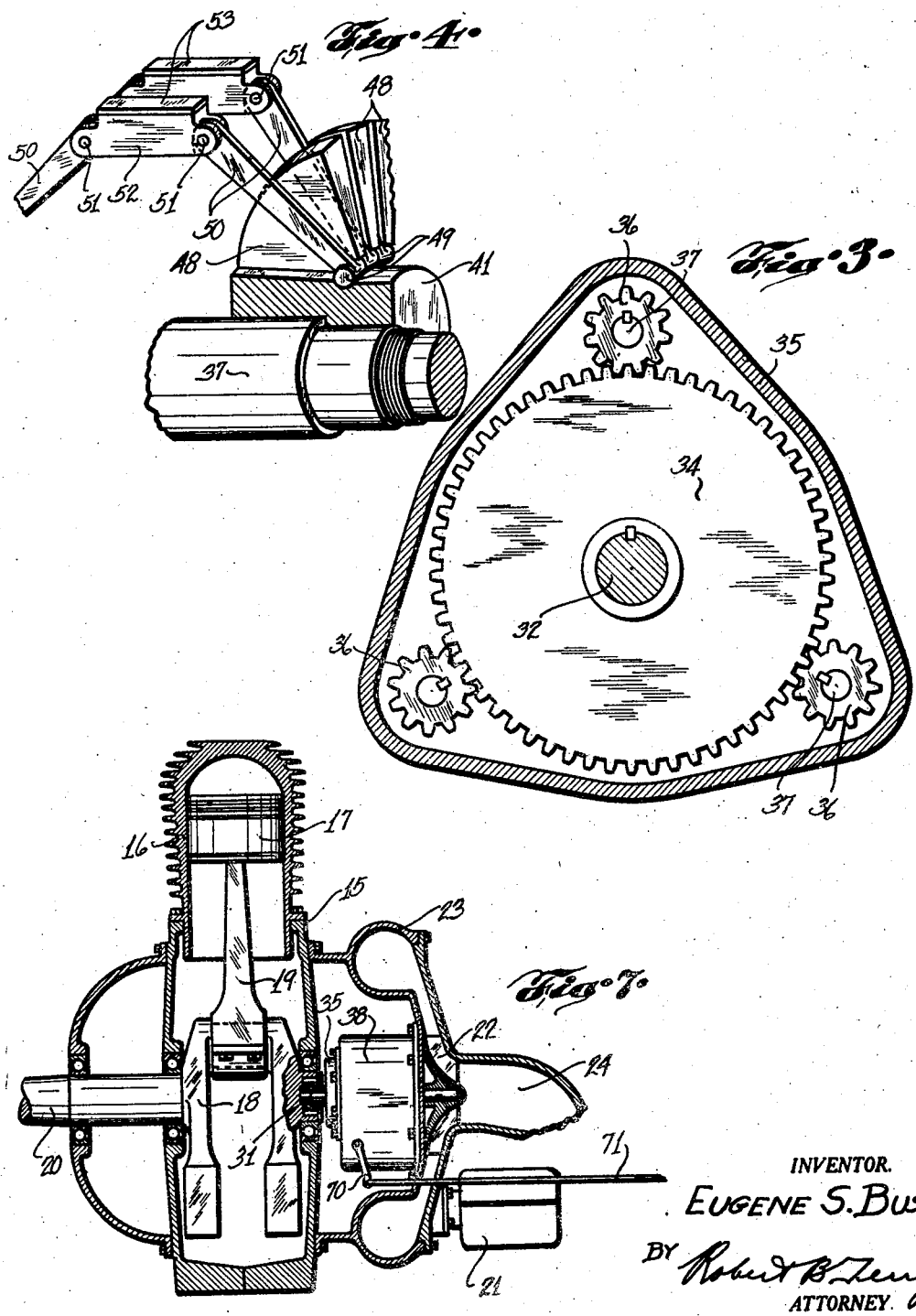

Jan. 25, 1938.  E. S. BUSH  2,106,237
ENGINE BLOWER DRIVE AND CONTROL
Filed Feb. 4, 1935   5 Sheets-Sheet 4
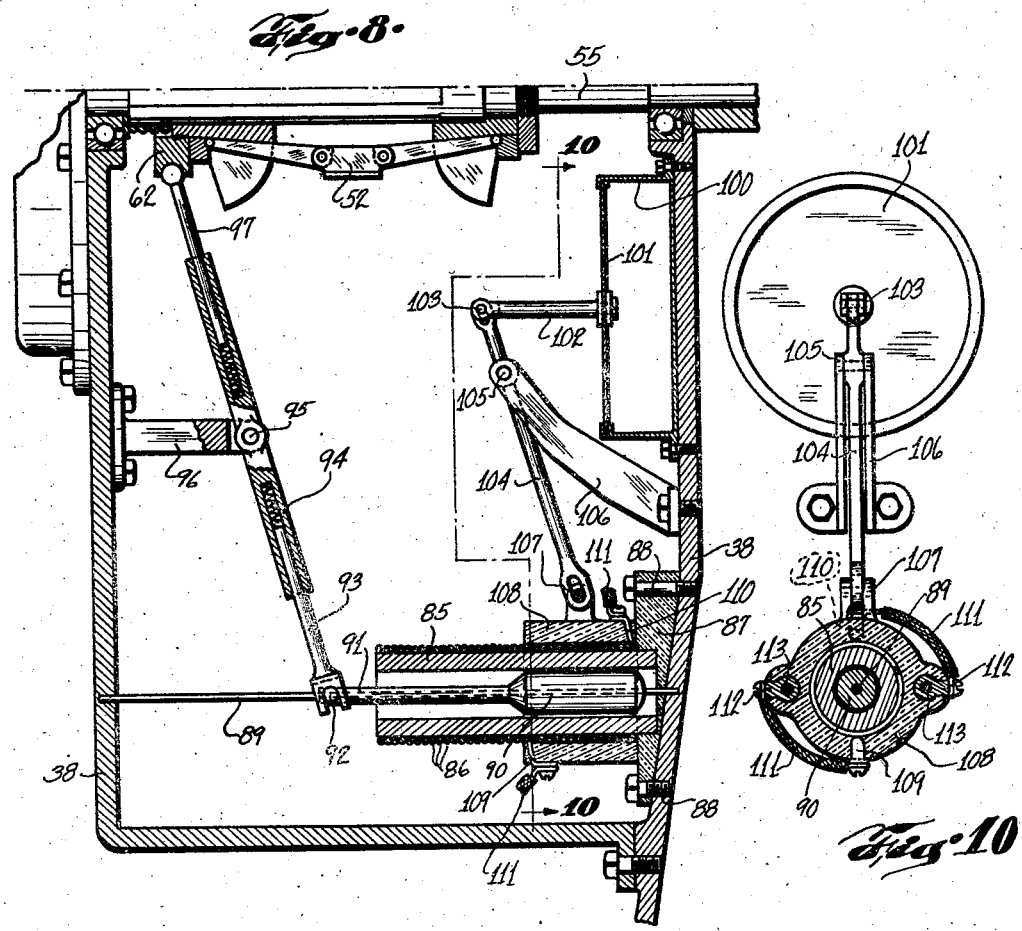
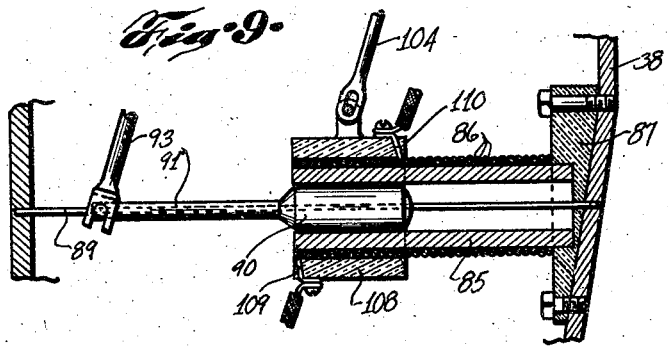
INVENTOR.
EUGENE S. BUSH
BY Robert B. Terry
ATTORNEY.

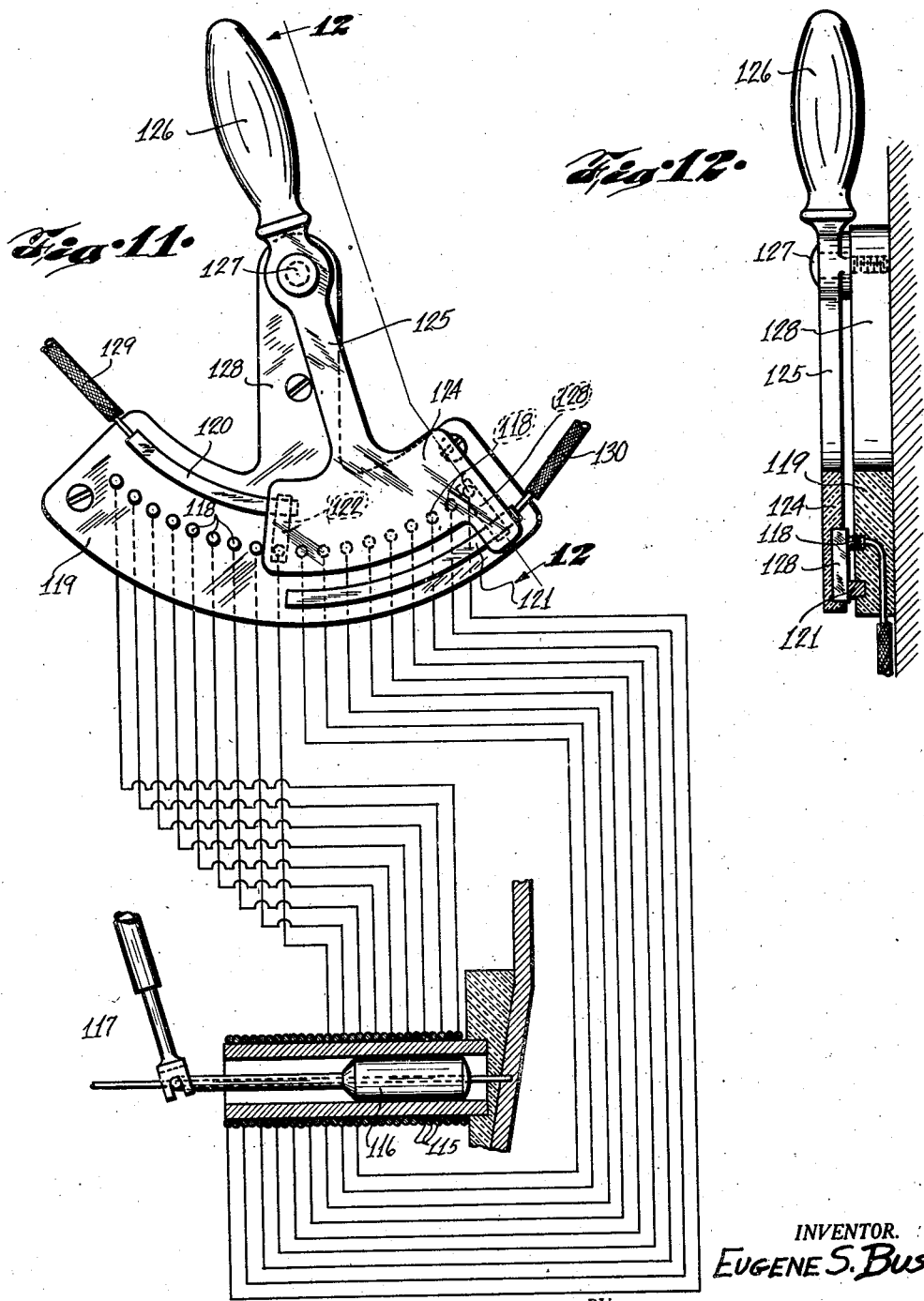

Patented Jan. 25, 1938

2,106,237

UNITED STATES PATENT OFFICE 2,106,237

ENGINE BLOWER DRIVE AND CONTROL

Eugene S. Bush, St. Louis, Mo., assignor to Bush Manufacturing Company, St. Louis, Mo., a corporation of Missouri Application February 4, 1935, Serial No. 4,742

8 Claims. (Cl. 230—116)

This invention relates to improvements in engine blower drives and controls, and particularly to an automatically-variable drive assembly for use in combination with aircraft engines of internal combustion type.

The present tendency toward and improved facilities for commercial flying at higher altitudes, has accentuated the necessity for an automatic control of engine air input, for example, as by a supercharger, commensurate with the increased range of altitudes encountered. The present substantial number of controls and instruments and the demands thereof upon the pilot's attention and time, dictate the advisability of a reliable automatic control of as many control elements as possible. In the fulfillment of this existing demand, the present invention has its general object.

The usual practice in prevailing types of aircraft engines is to employ, for normalizing the pressure of air supplied to the engine at appreciable altitudes, a centrifugal supercharger driven directly from the engine, or through the agency of a train of gears. In the absence of speed-change provisions, it is obvious that, say at a constant cruising speed, the mass of air delivered by the supercharger is reduced with increase in altitude of the aircraft.

Speed change transmissions of usual type are inadequate for several reasons, principally because of excess weight and space requirements, and further because of the restricted number of definite speed ratios afforded by any equipment presently and practically available.

The present invention seeks objectively to avoid these difficulties by providing for the driving of an engine blower, such as a supercharger, through an automatic speed-change device which is susceptible of infinite variation in the speed ratios therethrough, between predetermined limits.

Yet another object of the invention is attained in an improved mechanical power transmission unit particularly adapted for the purpose noted, but susceptible of other uses, and through which an infinite number of ratios may be attained between upper and lower limits.

A still further object of the invention is attained, in a device of the general type noted, in the provision of rotatable drive elements of infinitely variable diameter between limits, but susceptible of controlled change in diameter, and hence in drive ratio, while in operation.

An additional object of the invention is attained in a supercharger drive of the type referred to, which is capable of extremely high speed operation, and in which provision is made for obviating adverse shearing stresses incident to the torque reversals often encountered in a high speed driven agency when powered by a lower, variable speed prime mover, such as an engine.

Yet another object may be noted as the provision for utilizing changes in the ambient pressure for controlling the rate of supercharger drive in connection with an aircraft engine, this object including an improved method of assuring, independently of the personal equation, a constant coordination of the supercharger drive speed, with fluctuations in ambient air pressure.

A still further object is attained in improved means for electrically energizing the control of a variable speed supercharger in response to variations in ambient air pressure.

The foregoing and still further objects will clearly appear from the following detailed description of certain preferred embodiments of the invention, and from the accompanying drawings, in which:

Fig. 1 is a vertical sectional elevation through certain of the power transmission elements and rotor of a supercharger embodying features of the present invention; Fig. 2 is a vertical transverse section of the assembly of Fig. 1, as viewed along line 2—2 thereof; Fig. 3 is a transverse sectional elevation of certain of the drive elements, as viewed along line 3—3 of Fig. 1; Fig. 4 is a fragmentary elevation in perspective, illustrating certain structural details of one of the variable-diameter power-transmission elements of the charger drive; Fig. 5 is a fragmentary structural detail shown in vertical sectional elevation, being a continuation, to the left, of Fig. 1, and showing a preferred form of operative connection including a unidirectional drive; Fig. 6 is a transverse section as viewed along line 6—6 of Fig. 5, showing details of the unidirectional connection; Fig. 7 is a vertical sectional elevation of an aircraft engine of radial type, in combination with which the features of the present invention are utilized; Fig. 8 is a vertical sectional elevation, corresponding to Fig. 1, but showing only the lower half of the casing containing the drive elements, and illustrating a modified arrangement of control parts; Fig. 9 is a fragmentary sectional elevation of certain of the control elements of Fig. 8, shown in a different position; Fig. 10 is a view partly in section and partly in elevation, taken along a staggered plane identified with line 10—10 of Fig. 8; Fig. 11 is a view, partly structural and partly diagrammatic, of a modified form of electrical control adapted for use with the system to be described, and Fig. 12 is a lateral sectional elevation of the switch assembly of Fig. 11, as it would appear when viewed along line 12—12 of Fig. 11.

Referring now by characters of reference to the drawings, there is shown by Fig. 7 an aircraft engine, indicated generally at 15, of radial type. The engine cylinders, one of which is shown at 16, each serves operatively to contain a power piston 17, while a crank 18 serves through the agency of a rod 19 to supply power to the crankshaft 20, to which may be secured the usual propeller hub or boss (not shown). There is shown as located rearwardly of the engine a carburetor 21, the air intake of which is supplied from a discharge duct (not shown) of a supercharger, the impeller of which is indicated at 22 and the volute or casing of which appears at 23. Air is supplied from a duct 24 which serves to receive air at ambient pressure, whence it is directed to the central area of the impeller. As will be understood, the air is discharged peripherally by the impeller 22, through the volute 23 whence it is directed at a volume and pressure proportionate to the impeller speed, into the carburetor and/or manifold of the engine.

The rear end of the engine crankshaft 20 is provided with a cupped recess 25 (Fig. 5) preferably formed to receive, and in part to constitute an overrun clutch which may be of the type shown by Figs. 5 and 6. The external element of this clutch is shown as a projection 26 on the crankshaft, while the internal element, shown at 27, is peripherally recessed to receive a plurality of rollers 28, each urged by a coil spring 29 into wedged driving position between the elements 26 and 27. The inner element 27 of the overrun clutch is internally splined as at 30 to accommodate corresponding external splines 31 on a stub shaft 32 of the variable speed drive gear assembly. The splined arrangement, as will appear, permits easy assembly and removal of the supercharger drive structure, for service or repair purposes.

The shaft 32 continues into a journalled portion of reduced diameter (Figs. 1 and 5) which is mounted in ball bearings 33, this shaft projecting beyond its journalled portion for the reception of a gear 34. This gear and shaft portion are keyed or otherwise fixedly secured together and contained within a detachable case section 35 which serves also to house a plurality of pinions 36 (Figs. 1 and 3), each of these pinions being in operative engagement with the gear 34 and each keyed or otherwise secured to a shaft 37.

The several shafts 37 are or may be uniform as to arrangement and appurtenances so that a description of one, say the upper such shaft, will suffice for a description of all thereof. The upper shaft 37 is journalled in the casing or housing 38 (Figs. 1 and 7), through the agency of ball or other anti-friction bearings 39. The shaft 37 further serves to carry a pair of hub structures such as 40 and 41, the hub 40 being, by preference, fixedly positioned axially of the shaft as by a threaded collar 42, while the opposite corresponding element is axially displaceable along the shaft while rotatably secured thereto, as by splines 43 on the shaft, engaging corresponding splines internally of the hub element 41. A coil spring 44 of compression type abuts the outer end of the hub structure 41 and engages the ball bearing structure 39 at its opposite end. A pair of collars 45 on the hub structure 41, and 46 on the structure 40, are kept in assembly respectively by a threaded collar 47 and the threaded collar 42, the collars 45 and 46 each being provided with and serving as abutments for a plurality of spacers 48, best shown by Fig. 4, the spacers being secured to or formed as parts of the associated collar, such as 45 or 46 and coacting therewith to position a plurality of pivot elements 49. To each of these pivots is connected a link 50, these links being, in turn, pivotally connected as at 51 to the opposite ends of a driving element 52 extending to the periphery of the rotatable structure constituted by the elements thus far described.

Each of the peripheral elements such as segments 52 is, by preference, provided with a facing 53 formed of a friction material firmly secured to the associated segment. It will have appeared from the relation of these elements in Figs. 1, 2, and 4, that the segments 52 collectively constitute the periphery of each of the power transmitting structures carried by the shafts 37. It will also have appeared that the link connection of the segments 52 to the hub elements 41 and 40, provides a rotatable power transmission wheel of variable diameter, and available with similar coacting elements for varying the speed ratio through the assembly to any desired degree between limits.

As will best appear from Figs. 2 and 3, my preference is to locate the several shafts 37 in fixed parallelism and balanced relation, as at equal angles about an intermediate or driven shaft 55. This shaft is journalled in the opposite walls of the housing 38 as by antifriction bearings 56, and is provided, rearwardly of the housing, with an extension 57 to which is secured, as by a key 58, the impeller 59 of the blower, or some equivalent fluid displacement element. The shaft 55 is provided on an end portion relatively opposite to the shafts 37, with a splined zone 60, and serves further to carry a variable-diameter drive structure, the corresponding elements of which bear the same reference numerals as those carried by the several shafts 37. It will, however, be noted that a relatively opposite hub element of the assembly on shaft 55 is axially movable, and that a spring 61 is located at the opposite end of the assembly relative to the spring 44, with the result that the springs 44 and 61 are oppositely loaded.

It is my preference to provide for control of the variation in relative diameters of the variable-ratio power transmission elements on the shafts 37 and 55, through an axially movable collar 62 provided with a peripheral groove 63 receiving a ball end or yoke 64. The collar and element 64 engage in such manner that the collar is rotatable, while the part 64 is held against rotation but movable axially of shaft 55 through a control rod 65. The control rod is in telescopic engagement with a pivoted arm 66 provided with a sleeve end for telescopically receiving the member 65, and also containing a spring 67 tending to urge the rod 65 into controlling engagement with the collar 62. The arm 66 is pivoted as at 68 to a bracket 69 carried by the adjacent wall of the case 38. It is my preference to extend the pivot 68 to a point exteriorly of the casing 38, for the reception of an arm 70 (Fig. 7), to which may be pivotally secured a control rod 71 extending to a convenient point of manual access, say an instrument board in the control cockpit.

The provision of a manual control is optional, as will appear, it being my preference to provide for automatic variation in position of the collar 62, and hence for automatically varying the relative diameters of the drive structures on shafts 37 and 55. It may here be noted that the maximum diameter of each of the variable transmission members is determined according to the abutting positions of the companion hub structures thereof, while the minimum diameter, substantially as the central element appears in Fig. 1, is determined by the outermost possible position of the collar 62, providing a maximum spacing of the associated hub structures. It may further be noted that in this position, as appears in Fig. 2, the peripheral segments 52 are in lateral adjacence to each other, and so provide a continuous periphery, while the spacing of the peripheral segments in the position of greatest diameter is preferably such as not to exceed the peripheral width of the individual segments.

As a means for automatically controlling the speed ratio through the drive illustrated by Figs. 1 and 2, there is shown a vacuum or aneroid casing, preferably formed of metal, the bottom and side walls of which are indicated at 72 and 73 respectively, and the upper wall 74 of which constitutes a flexible diaphragm. Secured centrally of this diaphragm, or at a position to be imparted the maximum movement thereof responsive to changes in ambient pressure, is a post 75, pivotally connected as at 76 to a link 77 which is, in turn, pivoted by a pin 78 to a right angular extension 79 of the rod 66. It will appear that this arrangement serves to translate a vertical movement (Fig. 1) of the diaphragm 74, to an axial movement of collar 62, and hence serves to effect a corresponding change in the proportionate diameters of the variable drive elements carried respectively by shafts 55 and 37.

Assuming that the engine 15 is operating at a substantially constant predetermined cruising speed, it becomes apparent that a reduction in the ambient air pressure due to changes in altitude, will automatically flex the diaphragm 74 outwardly, so as to reduce the diameter of the variable driving wheel of shaft 55 and correspondingly to increase the diameter of the elements on each of shafts 37, thereby increasing the speed of the impeller 59, and tending closely to maintain a constant pressure to the carburetor or intake manifold of the engine irrespective of altitude or other changes in barometric pressure. Obviously, an opposite movement of the diaphragm and other control elements will occur in response to an increase in presusre, due, say, to a loss of altitude.

It will have been observed that the variable drive wheels of Figs. 1 and 2 are easily susceptible of change in diameter while the device is in operation, and that during such period the oppositely acting and loaded springs 44 and 61 serve to maintain the friction elements 53 of the coacting wheels, in frictionally engaging relation. It will further appear that, due to the opposite and substantially equal loading of the springs 44 and 61, the requirement of control energy for effecting changes in the relative diameter of these members is quite small, and hence in many instances, may be cared for by constructing the diaphragm and diaphragm chamber of a size not prohibitive from the point of view of aircraft space requirements. When, however, it is desired because of space or other restrictions, there may be operatively interposed in the control system, an independent source of energy, exemplified according to the modification of Fig. 8, by the use of an electromagnetic structure consisting of a solenoid having a tubular core 85 upon which is wound the number of ampere-turns of conductor 86, requisite to provide the desired flux. The core 85 is supported at one end as by a fibre or other insulating block 87, detachably secured as by cap screws 88 to a wall of the case 38. A rod 89 serves as a guide for slidably receiving the movable core or armature 90 of the solenoid, the armature being provided with a tubular extension 91, carrying trunnions 92 engaged by the forked end of the control rod 93, this rod being telescopically received by one of the paired hollow ends of a lever 94 pivoted at 95 to a stationary bracket 96. At the opposite end of the pivoted element 94, is telescopically received an arm 97 which engages the axially movable collar 62 described in connection with Fig. 1.

It will appear as desirable to provide for an infinite degree of variation in the diameter of the rotatable element carried by shaft 55, and hence a corresponding inverse variation in the companion variable ratio elements carried by the shafts 37. According to the modification shown by Figs. 8–10, an aneroid casing 100 provided with an outer wall in the nature of a diaphragm 101, is mounted on a vertical wall of the case 38, the diaphragm 101 being connected through a post 102 and a pivoted slot-and-pin connection 103 to a lever 104. This member is so pivoted at 105 to a stationary arm 106, that the short end of the lever is connected to the diaphragm. The opposite end pivotally engages, through a slot-and-pin connection 107, a contact slide 108, the slide being movable from end to end of the wound length of the solenoid.

The slide 108 serves to carry a pair of diametrally opposed and endwise spaced contacts 109 and 110, which directly engage bared portions of the winding 86. Contacts 109—110 are energized through conductors 111, each secured at its opposite end to a binding post 112, the posts being in sliding circuit relation with conductor rods 113 connected to a suitable source of supply (not shown). The rods 113 are conveniently mounted along and laterally of the coil, so as guidingly to support the insulating body constituting the slide element 108.

From the foregoing it will appear that the solenoid is of constantly-energized type, and that any selected zone thereof may be energized, which is of an axial length equivalent to the longitudinal distance between the contacts 109 and 110. It will further be seen that outward movement of the diaphragm 101 will operate through lever 104 to move the slide 108, and hence the armature, to the right (Fig. 8) and in a direction to move the collar 62 to the left, to reduce the effective operating diameter of the variable ratio wheel of shaft 55. It will clearly appear that this control movement operates to increase the speed of the supercharger conformably to a reduction in ambient atmospheric pressure. It will also be understood that the armature or core 90 will follow the movement of the lower end of rod 104 which determines the zone of energization of the electromagnet in a manner to provide, between limits, a practically infinite number of different speed ratios; further that practically any movement of the diaphragm 101 will result in a corresponding, although multiplied movement of slide 108 and hence of armature or core 90.

In Fig. 9 the control elements described, particularly the armature, core and slide, are shown in the relation they would occupy at extremely reduced air pressures, being the position relatively opposite to the preceding figures.

A slightly further modified agency for control of the solenoid is shown by Figs. 11 and 12 as adapted to a manual arrangement. In this arrangement the proximate turns of the winding 115 are not directly engaged by a contact slide, but are selectively and progressively energized for shifting the position of the armature 116 and the control arm 117 by a remote control agency. The several turns of conductor in proximate zones are connected in sequence to a row or series of stationary contacts 118, the connections from these button contacts being made on one end of a stationary spider 119 to turns near the right hand end (Fig. 11), while those on the right hand end of the quadrant or spider are connected to turns toward the opposite end of the solenoid core. The quadrant 119 serves to carry a pair of spaced arcuate contacts 120 and 121, the former being engaged by a brush 122, and the latter by a brush 123 carried by an insulating portion 124 of a rotatable lever 125. The lever is shown as actuated by a control handle 126, pivoted at 127 to an extension 128 of the spider 119. The arcuate contacts 120 and 121 are connected through conductors 129 and 130 respectively, to a source (not shown) of electrical energy.

As will appear from Fig. 11, the course of the current may be followed, for example, from conductor 129 through the arcuate strip 120 and brush 122, through one of the buttons 118 into the core; from an opposite spaced turn or winding of the electromagnet the current is returned through a spaced button contact 118, thence through brush 123 to contact 121 and out through conductor 130. From this it will appear that movement of the lever 125, as by handle 126, will cause a progressive energization of the turns 115 of the solenoid in proximate zones thereof, so that the core or armature 116 and hence the lever 117, will be given a movement directly following that of the lever 125. The arrangement is such that, by using a sufficient number of turns 115 and a sufficient number of the fixed contacts 118, the core is positionable in any zone between the end limits of its movement; otherwise expressed, the arrangement as employed for the control of an assembly such as that shown by Fig. 8, is susceptible of a practical infinite number of different control placements. Although the arrangement of Fig. 11 is shown as manually controlled, the lever 125 may be replaced by an automatic control system such as shown by Fig. 8, wherein the lever 104 would be substituted for lever 125.

It will appear from the foregoing description that the described system serves to maintain a dependable, fully automatic control over the engine air supply, even though the engine itself be operating at a constant speed and through a substantial range of altitudes and ambient air pressures, it being understood that the described control of output of the engine charger or blower may be accomplished by other structural agencies than those described, and that the invention in its broader sense comprehends the method of engine operation, as well as the structural embodiments or agencies by which the result is attained.

While the invention has been described by reference to certain exemplary embodiments thereof, the foregoing is to be understood solely in a descriptive and not in a limiting sense, since numerous changes may be made in the parts; their arrangement and their combinations, without departing from the full intended scope of the invention as defined by the claims hereunto appended.

I claim:

1. In a drive and control assembly for a blower or the like, a variable speed transmission through which the blower is driven, a ratio-varying control member associated with the transmission, a device responsive to air pressure, an electromagnet in actuating relation to said control member, and control connections from the air-pressure-responsive device to the electromagnet.

2. In a drive and control assembly for a blower whose output is desirably variable according to air pressure, a variable speed driving device for the blower, a control member in speed-varying association with the device, an aneroid apparatus including an element movable responsively to changes in air pressure, an electromagnet in actuating relation to said control member, switching means associated with the electromagnet, and a switch-actuating connection from the pressure responsive element to the switching means.

3. The combination in a drive and control assembly for use with a supercharger or like device, of a variable speed transmission through which the driven device is operated, a speed-varying control member associated with the transmission, electromagnetic means in actuating relation to the control member, a device movable responsively to changes in fluid pressure, and switching means for the electromagnet operable in response to changes in the last said device.

4. In a drive and control assembly for a supercharging blower or the like, a power transmission through which the blower is driven, the transmission being of a type to provide a substantially infinite number of variations in drive ratio between practical upper and lower limits, a barometric control for the transmission, an electromagnet in direct controlling relation with the transmission, and being of a type providing for minute control displacements, and switching means in circuit with the electromagnet device, and operable responsively to any substantial functional change in the barometric device.

5. In a drive and control assembly for a blower or the like, a variable speed tranmission, a ratio-varying control member associated with the transmission, a device having a portion movable in response to changes in air pressure, an electromagnet in actuating relation to said control member, a control connection from the pressure-responsive device to the electromagnet, and a balancing device for said control member, associated with the transmission and tending to equalize the energy for movement thereof incident to variation of transmission ratio.

6. In a drive and control assembly for a blower or the like, a variable speed transmission, a ratio-varying control member associated with the transmission, a barometrically responsive device, an electromagnet in actuating relation to said control member, control connections from the barometrically responsive device to the electromagnet, and paired, oppositely disposed resilient elements associated with the transmission, each tending to assist, and the other to oppose movement of said control member in either direction, whereby to minimize the energization of the electromagnet necessary to effect predetermined movements of said control member.

7. In a drive and control assembly adapted for a supercharger blower or the like, a transmission through which the blower is driven, and being of a type providing for a substantially infinite number of speed ratios between practical upper and lower limits, a barometric device for establishing the transmission speed ratio, an electromagnet connected in speed-varying relation to the transmission, a movable contact member associated with the electromagnet, and a connection from the barometric device to the contact member.

8. In a drive and control assembly for a supercharger blower, a drive shaft, a transmission connecting the drive shaft to the blower, the transmission including a pair of coacting rotary members of inversely variable diameters, a pair of oppositely loaded spring elements coacting in tending to equalize the diameters of the coacting transmission elements, and tending to equalize the energy for effecting ratio changes through the transmission, an electromagnet including a movable core, a reciprocable arm connecting the core to the transmission for varying the relative diameters of its elements, the electromagnet including a substantial number of exteriorly exposed adjacent turns of conductor, a contact slide mounted exteriorly of the electromagnet, and movable to engage the exposed portions of its turns, a lever in actuating relation to the contact slide, an aneroid chambered structure having a wall portion movable responsively to change in air pressure, and a connection from said wall portion to the slide lever.

EUGENE S. BUSH.